(12) United States Patent
Granados et al.

(10) Patent No.: US 9,206,806 B1
(45) Date of Patent: Dec. 8, 2015

(54) SOLIDS PUMP HAVING FEED GUIDES

(71) Applicant: General Electric Company, Schenectady, NY (US)

(72) Inventors: Luis Granados, Houston, TX (US); Jeffery Allen Rader, Arleta, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/452,195

(22) Filed: Aug. 5, 2014

(51) Int. Cl.
*B65G 31/04* (2006.01)
*F04D 7/02* (2006.01)
*F04D 29/42* (2006.01)

(52) U.S. Cl.
CPC *F04D 7/02* (2013.01); *B65G 31/04* (2013.01); *F04D 29/422* (2013.01)

(58) Field of Classification Search
CPC .............. B65G 31/04; F23K 3/00; F23K 3/02; F23K 2203/008; F04D 29/422; F04D 29/22; F04D 29/2211; F04C 13/007; F04C 2210/1044
USPC ........................................................ 198/642
See application file for complete search history.

(56) References Cited

U.S. PATENT DOCUMENTS

| | | | |
|---|---|---|---|
| 4,067,666 A | 1/1978 | Richards | |
| 4,384,659 A | 5/1983 | Richards | |
| 4,988,239 A | 1/1991 | Firth | |
| 5,051,041 A | 9/1991 | Firth | |
| 5,402,876 A | 4/1995 | Hay | |
| 5,485,909 A | 1/1996 | Hay | |
| 5,497,873 A | 3/1996 | Hay | |
| 5,551,553 A | 9/1996 | Hay | |
| 6,213,289 B1 | 4/2001 | Hay et al. | |
| 8,544,633 B2 | 10/2013 | Stevenson et al. | |
| 8,579,103 B2 | 11/2013 | Stevenson et al. | |
| 8,794,385 B2 * | 8/2014 | Russell | B65G 45/02 184/15.2 |
| 8,887,649 B2 * | 11/2014 | Russell et al. | F04C 13/007 110/101 R |
| 9,004,265 B2 * | 4/2015 | Aldred et al. | F04D 2/00 198/642 |
| 2003/0190198 A1 * | 10/2003 | Baer et al. | B65G 31/04 406/52 |
| 2007/0084700 A1 * | 4/2007 | Baer | B65G 31/04 198/642 |
| 2011/0255961 A1 * | 10/2011 | Akundy | F01C 21/0809 415/208.1 |

* cited by examiner

*Primary Examiner* — Mark A Deuble
(74) *Attorney, Agent, or Firm* — Fletcher Yoder, P.C.

(57) ABSTRACT

A system includes a solid feed pump that includes a housing, a rotor disposed in the housing, a curved passage disposed between the rotor and the housing, an outlet coupled to the curved passage, and a plurality of solid feed guides extending across the curved passage adjacent the outlet. Each solid feed guide of the plurality of solid feed guides is configured to direct solid feed within the curved passage towards the outlet, and each solid feed guide of the plurality of solid feed guides is disposed at a different respective circumferential location along the curved passage relative to a rotational axis of the rotor.

20 Claims, 3 Drawing Sheets

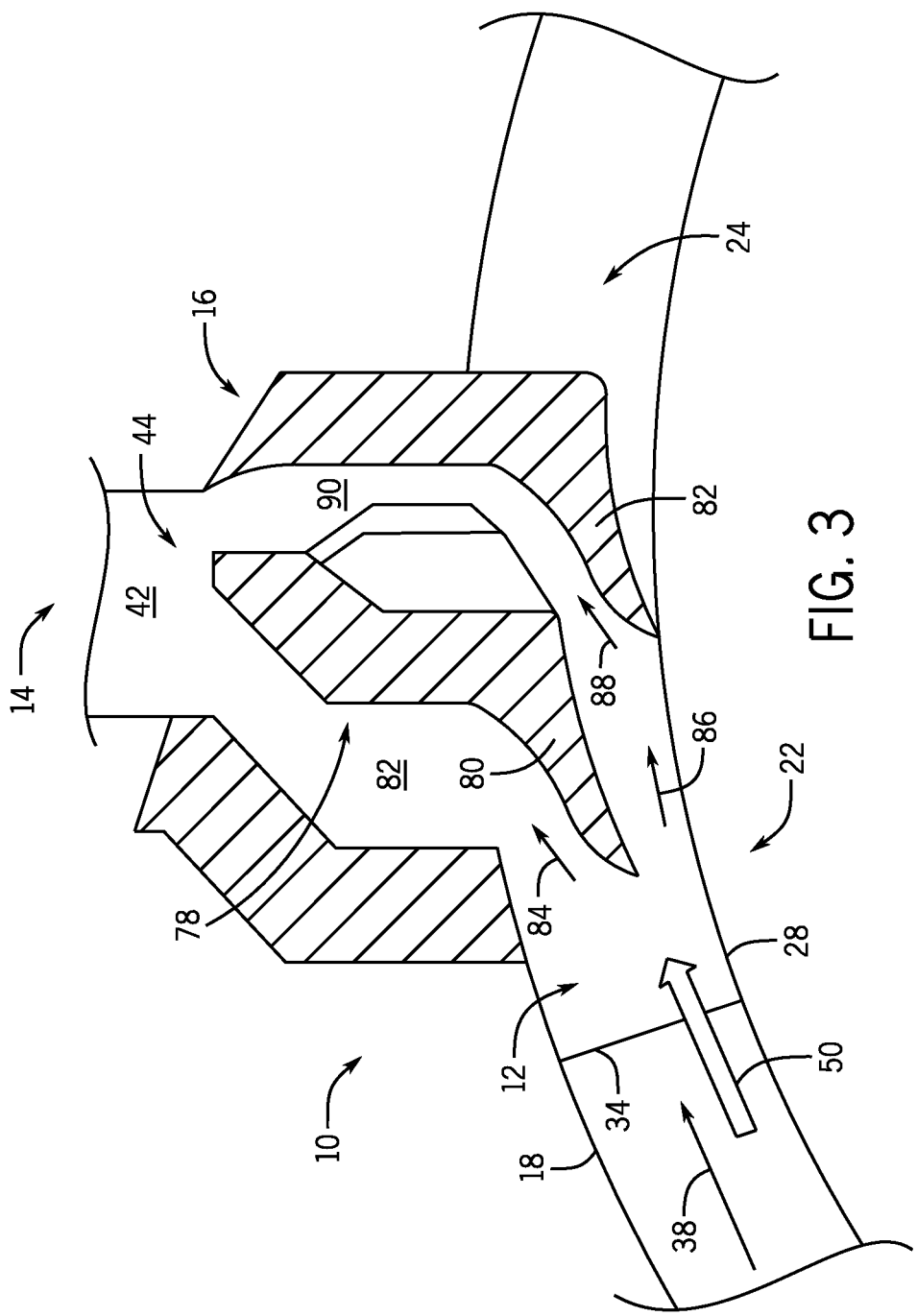

SOLIDS PUMP HAVING FEED GUIDES

BACKGROUND

The subject matter disclosed herein relates to solids pumps that convey a solid feed from one industrial process to another.

Various industrial processes include conveying solids from one process to another. Each process may use solids of various sizes, shapes, material consistencies, or other material characteristics. Additionally, each process may use the solids under various temperatures, pressures, humidity levels, or other operational conditions. As a result of different material characteristics and/or operational conditions between processes, conveying the solids may involve large torques and forces on the equipment used to transport the solids.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a solid feed pump that includes a housing, a rotor disposed in the housing, a curved passage disposed between the rotor and the housing, at least one outlet coupled to the curved passage, and a plurality of solid feed guides extending across the curved passage adjacent the outlet. Each solid feed guide of the plurality of solid feed guides is configured to direct solid feed within the curved passage towards the outlet, and each solid feed guide of the plurality of solid feed guides is disposed at a different respective circumferential location along the curved passage relative to a rotational axis of the rotor.

In a second embodiment, a system includes a solid feed pump that includes a housing, a rotor disposed in the housing, the rotor having a first disc and a second disc coupled to a hub, a curved passage disposed between the rotor and the housing, and at least one outlet coupled to the curved passage. The solid feed pump also includes a first solid feed guide extending across the curved passage adjacent the outlet, the first solid feed guide is configured to direct solid feed within the curved passage towards the outlet, and the first solid feed guide includes a first end disposed adjacent a lateral surface of the hub located between the first and second discs. The first end and the lateral surface are separated by a first minimal distance. The solid seed pump also includes a second solid feed guide extending across the curved passage adjacent the outlet, the second solid feed guide is configured to direct solid feed within the curved passage towards the outlet, and the second solid feed guide includes a second end disposed adjacent the lateral surface of the hub located between the first and second discs. The second end and the lateral surface are separated by a second minimal distance, and the first minimal distance is greater than the second minimal distance.

In a third embodiment, a system includes a solid feed pump that includes a housing, a rotor disposed in the housing, the rotor includes a first disc and a second disc coupled to a hub. The solid feed pump also includes a curved passage disposed between the rotor and the housing, at least one outlet coupled to the curved passage, and a first solid feed guide extending across the curved passage adjacent the outlet. The first solid feed guide is configured to direct solid feed within the curved passage towards the outlet, and the first solid feed guide includes a first end disposed adjacent a lateral surface of the hub located between the first and second discs. The first end and the lateral surface are separated by a first radial offset distance. The solid feed pump also includes a second solid feed guide extending across the curved passage adjacent the outlet. The second solid feed guide is configured to direct solid feed within the curved passage towards the outlet, and the second solid feed guide has a second end disposed adjacent the lateral surface of the hub located between the first and second discs. The second end and the lateral surface are separated by a second radial offset distance, and the first radial offset distance is greater than the second radial offset distance.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a cross-sectional side view of an embodiment of the solid feed pump of FIG. 1 having multiple solid feed guides.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems for directing solid feed from a solid feed pump. In particular, the solid feed pump includes a plurality of solid feed guides arranged in a staggered arrangement and configured to direct a portion of the solid feed stream from a passage rotating within the solid feed pump from an inlet to an outlet of the solid feed pump. For example, an embodiment of the solid feed pump may include a first solid feed guide that directs a portion of the solids to the outlet while letting some solids continue within the passage past the first solid feed guide. Subsequent solid feed guides direct a smaller portion of solids, and thus experience less force from the solids as they rotate through the passage. The subsequent solid feed guides may thus experience less flex or adjustment due to the forces from the solid feed, which enables the subsequent solid feed guides to be positioned closer to a bottom side of the passage (e.g., outer surface of the hub of the rotor) without rubbing.

Figure 1:
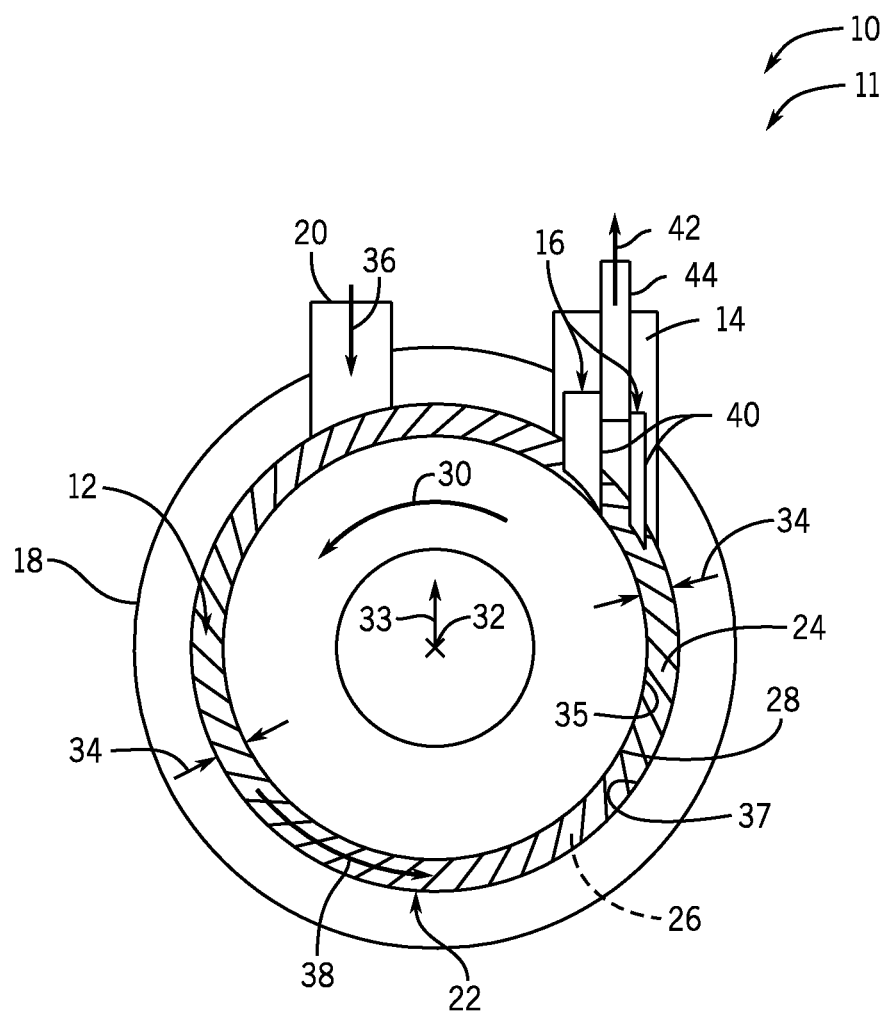
FIG. 1 is a schematic diagram of an embodiment of a solid feed pump having unique features to direct solid feedstock out of a passage of the solid feed pump.

FIG. 1 is a schematic diagram of an embodiment of a solid feed pump 10 having unique features to direct solid feed from a passage 12 of the solid feed pump 10 to an outlet 14. For example, one or more solid feed guides 16 may be positioned near the outlet 14 of the passage 12 to direct the solid feed as it is being rotated by the solid feed pump 10. In certain embodiments, the solid feed pump 10 may be a Posimetric® pump made by General Electric Company of Schenectady, N.Y. The term "posimetric" may be defined as capable of metering (e.g., measuring an amount of) and positively displacing (e.g., trapping and forcing displacement of) a substance being delivered by the pump 10. The pump 10 is able to meter and positively displace a defined volume of a substance, such as a solid fuel feedstock (e.g., a carbonaceous feedstock). In particular, the solid feed pump 10 is configured to transport a solid feed. The pump path may have an elliptical shape (e.g., circular or curved shape). The pump 10 may be used in any suitable application, such as an integrated gasification combined cycle (IGCC) system, a gasification system, a solid fuel transport system, a combustion system, a reactor, or any combination thereof. For example, the pump 10 may be used to continuously supply a pressurized flow of solid feedstock to a gasifier for gasification, thereby producing a syngas. Thus, the solid feedstock may include coal, biomass, or other carbonaceous feedstock. Other suitable applications include production of chemicals, fertilizers, substitute natural gas, transportation fuels, or hydrogen.

As shown in FIG. 1, the illustrated solid feed pump 11 includes a housing 18, inlet 20 (e.g., solid feed inlet), the outlet 14 (e.g., solid feed outlet), and rotor 22. In certain embodiments, locations of the inlet 20 and the outlet 14 of the pump 11 may vary. The rotor 22 may include two substantially opposed and parallel rotary discs 24 and 26 coupled to a hub 28, which collectively define a movable wall. The rotary discs 24 and 26 and hub 28 (e.g., annular-shaped wall portions) may be movable relative to the housing 18 in a rotational direction 30 from the inlet 20 towards the outlet 14 about a rotational axis 32. The hub 28 may be positioned a distance 34 away from an inner surface 37 of the housing 18 disposed directly (e.g., radially 33) above an outer (e.g., lateral) surface 35 the hub 28 to form the passage 12 between the rotary discs 24 and 26. The inlet 20 and the outlet 14 may be coupled to the passage 12 (e.g., curved, circular, or annular passage).

In certain embodiments, the pump 11 includes more than one passage 12 (e.g., 2-10 passages), where each passage 12 includes at least one solid feed guide 16 positioned at or near the outlet 14 of the passage 12. For example, each of the passages 12 may be formed between a pair of opposed and parallel rotary discs 24 and 26 coupled to a hub 28. The passage 12 may extend circumferentially 360 degrees within the solid feed pump 10 and adjacent solid feed guides 16 may be spaced apart less than 10 degrees relative to the rotational axis 32 of the rotor 22. In certain embodiments, the outlet 14 may include a plurality of solid feed guides 16 positioned at different circumferential locations (e.g., staggered in the rotational direction 30) along the passage 12. The passage 12 is disposed between the two rotary discs 24 and 26, the outer surface of the hub 28, and within the housing 14. The solid feed guide 16 may extend across the passage 12 between the rotary discs 24 and 26. The rotary discs 24 and 26 and the solid feed guide 16 interact to form sliding interfaces as the discs 24 and 26 rotate in the rotational direction 30. The hub 28 and one of the solid feed guides 16 interact to form a sliding interface 34 as the hub 28 rotates in the rotational direction 30. In particular, the hub 28 is configured to move along the sliding interface 34 with the solid feed guide 16.

As solid feed is fed through an opening 36 of the inlet 20, the solid feed pump 11 may impart a tangential force or thrust to the solid feed in the rotational direction 30 of the rotor 22. The solid feed is transported in a flow direction 38 from the inlet 20 to the outlet 14. The inlet 20 and the outlet 14, as illustrated, are located at substantially opposite ends of the passage 12. That is, the solid feed travels from the inlet 20 almost 360 degrees around the inside of the housing 18 before being directed into the outlet 14. In certain embodiments, the solid feed may travel less around the inside of the housing 18. For example, the solid feed may travel 120 degrees, 180 degrees, 240 degrees, 270 degrees, or more around the inside of the housing 18 along the passage 12. In addition, the solid feed moves and becomes pressurized from low to high pressure before being discharged from the outlet 14 of the pump 11. During transport through the pump 11, the solid feed locks-up, increases in pressure, and exits the pump 11 at a generally constant rate. As the solid feed rotates through the passage 12, the solid feed encounters a guide wall 40 of the solid feed guide 16 disposed adjacent the outlet 14 extending across the passage 12. The solid feed is diverted by the solid feed guide 16 through an opening 42 of the outlet 14 into an exit pipe 44 connected to a high pressure vessel or into a conveyance pipe line. For example, the pipe 44 may deliver the solid feed (e.g., solid fuel feedstock) to a gasifier, which then converts the feedstock into a synthesis gas or syngas. The outlet 14 may also include multiple pipes 44 into which the solid feed is directed. Multiple pipes 44 may be beneficial for delivering the solid feed to multiple processes, reducing load on each individual pipe 44, and/or otherwise increasing efficiency in the solid pump 10. As described in greater detail below, the guide wall 40 for each solid feed guide 16 (e.g., 1, 2, 3, 4, 5, 6, 7, 8, 9, 10, or more solid feed guides 16) directs a portion of the solid feed from the passage, so that subsequent solid feed guides 16 experience less pressure and force on the guide wall 40.

Figure 2:
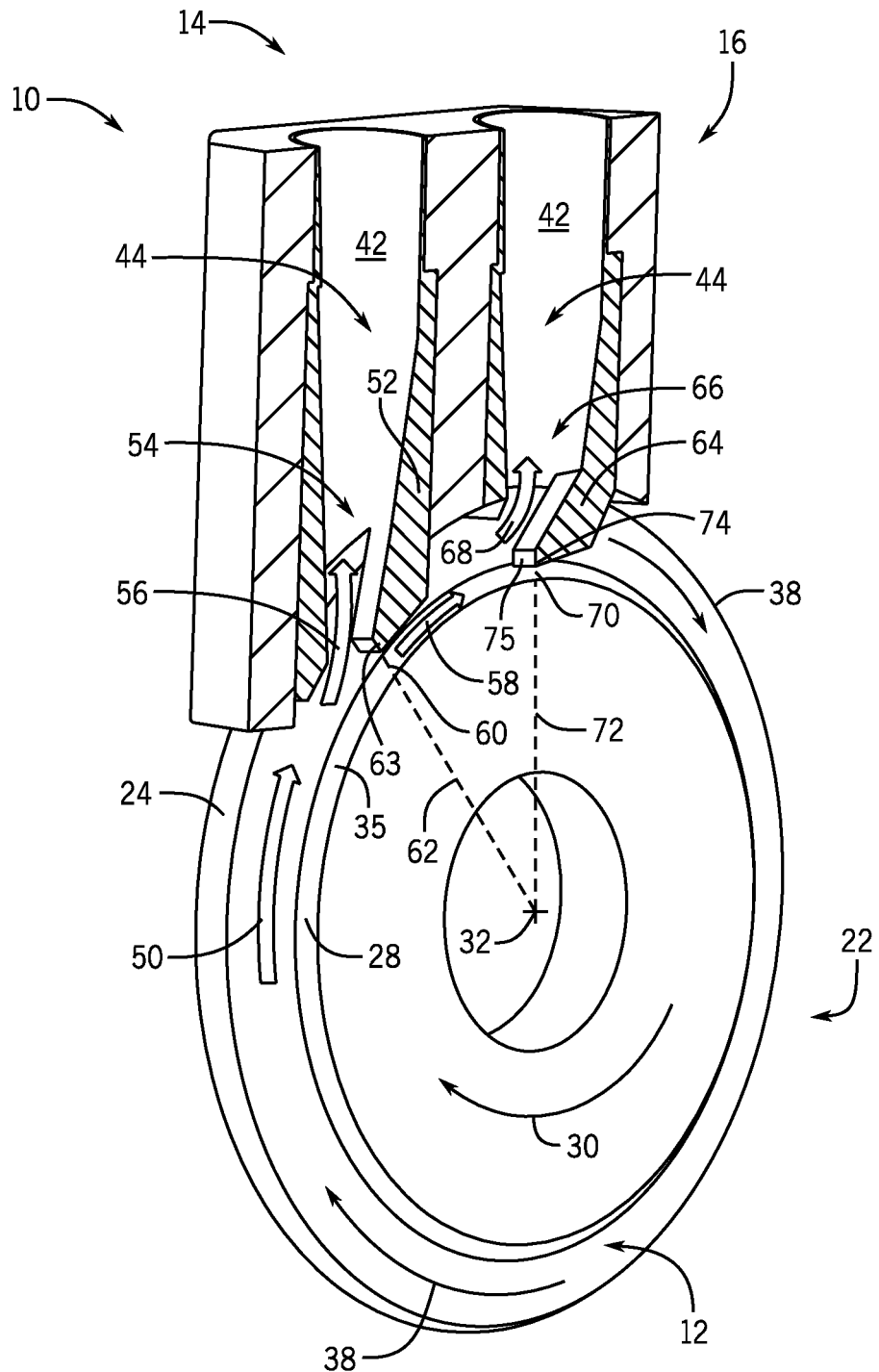
FIG. 2 is a cutaway perspective view of an embodiment of the solid feed pump of FIG. 1.

FIG. 2 is a cutaway perspective view of an embodiment of the solid feed pump 10 of FIG. 1. Some components, such as the housing 18 and the inlet 20, are not illustrated for purposes of simplicity for this discussion, but would be included in certain embodiments as part of the solid feed pump 10. The illustrated embodiment includes the rotor 22, the hub 28, and one of the rotary discs 24, with the other rotary disc 26 being cut away. The solid feed is conveyed from the inlet 20 toward the outlet 14 along the passage 12 as the rotor 22 rotates in the rotational direction 30 around the rotational axis 32. The solid feed includes a stream 50 of solid feed that moves with the rotor 22 in the flow direction 38 toward the outlet 14. As the stream 50 travels, it contacts a first solid feed guide 52 positioned at a first circumferential location 54 relative to the rotational axis 32. The first circumferential location 54 may be relatively near the inlet 20, or in certain embodiments may be further from the inlet 20 as described above with respect to FIG. 1. The first solid feed guide 52 directs a first portion 56 of the stream 50 of solid feed from the passage 12 to a pipe 42 of the outlet 14.

A remaining stream 58 of solid feed (the portion of the stream 50 that is not part of the first portion 56) continues past the first solid feed guide 50 in the flow direction 38, with the rotation of the rotor 22. The division of the stream 50 into the first portion 56 and the remaining stream 58 is determined, at least in part, by a distance 60 (e.g., a radial offset distance defining a radial gap or opening) between a first point (e.g., distal edge) 63 of the first solid feed guide 52 and the outer surface 35 (e.g., outer annular surface or circumference) of the hub 28 of the rotor 22 along a first radius 62 of the rotor 22. The first radius 62 is circumferentially aligned with the first point 63 on the first solid feed guide 52 that is closest to the rotor 22. Thus, the distance 60 is the minimum distance between the first solid feed guide 52 and the rotor 22. The distance 60 may be any distance between approximately 0 percent and 100 percent of the distance 34 between the outer surface 35 of the hub 28 and the inner surface 37 of the housing 18 disposed radially 33 above the hub 28 as measured from the hub 28. In certain embodiments, the distance 60 is approximately between 25 to 75 percent, 30 to 70 percent, 35 to 65 percent, 40 to 60 percent, or 45 to 55 percent of the distance 34 between the hub 28 and the housing 18 as measured from the hub 28. Additionally, in certain other embodiments, the distance 60 is greater than or equal to approximately 25, 30, 35, 40, 45, 50, 55, 60, 65, 70, or 75 percent of the distance 34 between the outer surface 35 of the hub 28 and the inner surface 37 of the housing 18 as measured from the hub 28.

A smaller distance 60, indicating that the first solid feed guide 52 is closer to the hub 28, may suggest that the first portion 56 will be a larger amount than it would be with a larger distance 60. Thus, the amount of solid feed directed into the pipe 44 is related to the distance 60. Additionally, the amount of the first portion 56 is also related to the amount of force or pressure that the stream 50 places on the first solid feed guide 52. Therefore, the amount of stress, wear, and/or flex experienced by the first solid feed guide 52 is determined at least in part by the distance 60, and a small distance 60 can mean that the first solid feed guide 52 may rub against the hub 28 if not highly strengthened and calibrated.

Similar to the first solid feed guide 52, a second solid feed guide 64 is placed at a second circumferential location 66 downstream from the first solid feed guide 52. The second solid feed guide 64 directs a second portion 68 of solid feed from the passage 12 to a pipe 44 of the outlet 14. The second portion 68 comes from the remaining stream 58 that passed by the first solid feed guide 52. The second solid feed guide 64, as illustrated, is positioned relatively close to the first solid feed guide 52. In certain other embodiments, the solid feed guides (e.g., first solid feed guide 52 and second solid feed guide 64) may be placed further from each other. For example, the first circumferential location 54 may be greater than or equal to approximately 5, 10, 15, 20, 25, 30, 45, 60, 75, 90, or 120 degrees from the second circumferential location 66 as measured from or relative to the rotational axis 32. In other embodiments, the first circumferential location 54 may be within approximately 1 to 90, 1 to 60, 1 to 45, 1 to 30, or 5 to 15 degrees, or less from the second circumferential location 66 as measured from or relative to the rotational axis 32. In certain embodiment, the pump 10 may include a plurality of solid feed guides (e.g., 2, 3, 4, 5, 6, 7, 8, 9, 10, or more) at increments of 1 to 10, 2 to 5 degrees one after another in a circumferentially staggered arrangement.

In certain embodiments, the second portion 68 may include the entire remaining stream 58, so that none, or substantially close to none (e.g., less than 1, 2, 3, 4, or 5 percent), of the solid feed (e.g., stream 50 and/or remaining stream 58) passes the second solid feed guide 64. As with the first solid feed guide 52, the second solid feed guide 64 is positioned a distance 70 (e.g., a radial offset distance defining a radial gap or opening) from the outer surface 35 of hub 28 of the rotor 22 along the second radius 72 of the rotor 22. The second radius 72 is circumferentially aligned with a second point 74 on the second solid feed guide 64 that is closest to the rotor 22. Thus, the distance 70 is the offset distance between the second solid feed guide 64 and the rotor 22. As mentioned above, the first radius 62 and the second radius 72 may be spaced within 10 degrees of each other. In certain other embodiments, the first radius 62 and the second radius 72 may be less than or equal to 5, 15, 20, 25, 30, 35, 40, or 45 degrees from each other. The relative circumferential distance may also extend to additional solid feed guides 16. That is, each adjacent solid feed guide 16 may be 5, 15, 20, 25, 30, 35, 40, or 45 degrees from each other. The second point 74 may include a deflection point 75 that is made of a relatively softer material such as plastic, nylon, polymer, Teflon, rubber, or other relatively softer material that will reduce wear on the hub 28 of the rotor 22. As such, the deflection point 75 is able to contact the hub 28 without wearing the hub 28. The deflection point 75 extends axially 32 along the entire length of the second point 74 of the solid feed guide 64 that interfaces with the outer surface 35 of the hub 28. Conversely, the first point (e.g., distal edge) 63 of the first solid feed guide 52 may include a more resilient material on the tip. For example, the first point 63 may include tungsten carbide or other carbide materials, ceramics, or hardened metals that resist wear.

A smaller distance 70, indicating that the second solid feed guide 64 is closer to the hub 28, may suggest that the second portion 56 will include a higher percentage of the remaining stream 58. As explained above, this may be accompanied by an increase in force applied to the second solid feed guide 64. The second solid feed guide 64, however, is directing solid feed only from the remaining stream 58 and therefore may increase the percentage taken as the second portion 68 without being subjected to forces that are as high as those experienced by the first solid feed guide 52. In other words, the second solid feed guide 64 may be positioned closer to the hub 28 without rubbing. In certain embodiments, the second solid feed guide 64 may be positioned a distance 70 of between approximately 0.10 to 1.00 millimeters, 0.25 to 0.75 millimeters, 0.40 to 0.60 millimeters, from the hub 28. In certain other embodiments, the second solid feed guide 64 may be positioned a distance 70 of between less that approximately 0.1, 0.2, 0.3, 0.4, 0.5, 0.6, 0.7, 0.8, 0.9, 1.0, 1.5, or 2.0 millimeters from the hub 28. In certain other embodiments, the second solid feed guide 64 may be positioned a distance 70 of between approximately 0 to 5, 0 to 4, 0 to 3, 0 to 2, or 0 to 1 percent of the total distance 34 away from the hub 28. In certain other embodiments, the second solid feed guide 64 may be positioned a distance 70 of less than approximately 0.1, 0.2, 0.3, 0.4, 0.5, 0.6, 0.7, 0.8, 0.9, 1.0, 1.5, or 2.0 percent of the total distance 34 away from the hub 28. These distances may ensure that all, or substantially all, of the solid feed stream 50 is directed to one of the pipes 44. For example, the plurality of solid feed guides may be configured to each handle an equal fraction or percentage of the solid feed, such as an equal fraction of 1/N where N equals the number of solid feed guides (e.g., 2, 3, 4, 5, 6, 7, 8, 9, 10, or more). By further example, the guides may be configured to each handle a non-uniform fraction or percentage of the solid feed. In some embodiments, the solid feed guides may handle a progressively increasing percentage of the solid feed in the downstream direction, such as 20, 30, and 50 percent. In other embodiments, the solid feed guides may handle a progressively decreasing percentage of the solid feed in the downstream direction, such as 50, 30, and 20 percent. Accordingly, the distances between the solid feed guides and the rotor 22 may be selected to achieve these equal, increasing, or decreasing percentages of the feedstock.

In certain other embodiments, the second solid feed guide 64 may also be configured to maintain the distance 70 without flexing. That is, the second solid feed guide 64 is configured to be rigid so that the point only shifts up to 0.05, 0.10, 0.15, 0.20, 0.25, 0.30, 0.35, 0.4, 0.5, 0.6, 0.7, 0.8, 0.9, 1.0, 1.5, or 2.0 millimeters closer or further away from the hub 28. In other embodiments, this may shift more, or less.

Other embodiments of the solid feed pump 10 may include further solid feed guides 16. For example, some embodiments may include 3, 4, 5, 6, or more solid feed guides 16. Each solid feed guide 16 may direct the solid feed into a pipe 44, or, as explained in detail below, each solid feed guide 16 may direct solid feed into the same pipe 44. In some embodiments, each solid feed guide 16 is further from the hub 28 than the solid feed guide 16 behind it along the flow direction 38. In other words, each solid feed guide 16 is closer to the outer surface 35 of the hub 28 of the rotor 22 than the previous solid feed guide along the flow direction 38 of the curved passage 12. Each subsequent solid feed guide 16 is positioned closer to the hub 28 to direct the remaining solid feed and lower the force and pressure experienced by the subsequent solid feed guides 16.

FIG. 3 is a cross-sectional side view of an embodiment of the solid feed pump 10 of FIG. 1 having multiple solid feed guides 16. The solid feed pump 10 includes the rotor 22, the rotary disc, the hub 28, and the housing 18, as described above. The solid feed pump 10 also includes a solid feed guide component 78 that contains the feed guides 16 and consolidates the directed solid feed into one pipe 44. The solid feed guide component 78, as illustrated, includes a primary solid feed guide 80 and a secondary solid feed guide 82. The primary solid feed guide 80 and the secondary solid feed guide 82 direct solid feed from the passage 12 into the pipe 44. The passage 12 contains and conveys the solid feed stream 50, which flows in the flow direction 38 due to the rotation of the rotor 22 and the rotary disc 24. In the illustrated embodiment, the solid feed stream 50 encounters the primary solid feed guide 80 and is directed from the passage 12 into the primary channel 82. As described above with respect to the first solid feed guide 52, the primary solid feed guide 80 directs a portion 84 of the solid feed stream 50 into the primary channel 82 to divide the force from the rotating solid feed between the primary solid feed guide 80 and the secondary solid feed guide 82.

After the solid feed passes the primary solid feed guide 80, the passage 12 (as with the embodiment of FIG. 2) contains a remaining stream 86. The remaining stream 86 then flows in the flow direction 38 to the secondary solid feed guide 82. The secondary solid feed guide 82 directs a secondary portion 88 of the remaining stream 86 from the passage 12 to the secondary channel 90. The secondary portion 88 and the primary portion 84 of solid feed eventually combine together in the pipe 44. The solid feed guide component 78, as illustrated, includes two solid feed guides (e.g., primary solid feed guide 80 and secondary solid feed guide 82), but other embodiments may include tertiary, quaternary, quinary, or more solid feed guides (e.g., 2, 3, 4, 5, 6, 7, 8, 9, 10, or more).

Technical effects of the disclosed embodiments include a solid feed pump 10 having a housing 18, a rotor 22, a curved passage 12, and solid feed guides 16. The solid feed guides 16 direct a portion (e.g., first portion 56, second portion 68, primary portion 84, or secondary portion 88) of solid feed from the passage 12 to an outlet 14 of the solid feed pump 10. Multiple solid feed guides 16 enables each solid feed guide 16 to be subjected to lower forces from the solid feed and thus experience less flex. A lower degree of flex enables the solid feed guides 16 to be more accurately positioned in relation to a hub 28 of the solid feed pump 10, which in turn reduces rub and/or wear of the hub 28/rotor 22 and the solid feed guide 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a solid feed pump, comprising:
a housing;
a rotor disposed in the housing;
a curved passage disposed between the rotor and the housing;
at least one outlet coupled to the curved passage; and
a plurality of solid feed guides extending across the curved passage adjacent the outlet, wherein each solid feed guide of the plurality of solid feed guides is configured to direct solid feed within the curved passage towards the outlet, and each solid feed guide of the plurality of solid feed guides is disposed at a different respective circumferential location along the curved passage relative to a rotational axis of the rotor.

2. The system of claim 1, wherein the solid feed pump comprises an inlet coupled to the curved passage, the curved passage comprises a solid feed flow path from the inlet to the outlet, and a first solid feed guide of the plurality of solid feed guides is further away from an outer surface of a hub of the rotor than a second solid feed guide of the plurality of solid feed guides along the solid feed flow path of the curved passage, wherein the first solid feed guide is located upstream of the second solid feed guide along the solid feed flow path.

3. The system of claim 1, wherein the solid feed pump comprises an inlet coupled to the curved passage, the curved passage comprises a solid feed flow path from the inlet to the outlet, and a first solid feed guide of the plurality of solid feed guides is configured to direct a larger amount of solid feed towards the outlet than a second solid feed guide of the plurality of solid feed guides along solid feed flow path of the curved passage, wherein the first solid feed guide is located upstream of the second solid feed guide along the solid feed flow path.

4. The system of claim 1, wherein at least one solid feed guide of the plurality of solid feed guides is disposed less than about 0.50 millimeters from an outer surface of a hub of the rotor.

5. The system of claim 1, wherein at least one solid feed guide of the plurality of solid feed guides is configured to flex less than 0.25 millimeters.

6. The system of claim 1, wherein a first solid feed guide of the plurality of solid feed guides is disposed across the curved passage at greater than or equal to approximately 20 percent of a distance from an outer surface of a hub of the rotor to an inner surface of the housing disposed radially above the rotor along a radius from the axis of the rotor.

7. The system of claim 1, wherein at least one solid feed guide of the plurality of solid feed guides comprises a plastic deflection edge disposed on a portion of the at least one solid feed guide that is closest to an outer surface of a hub of the rotor.

8. The system of claim 1, wherein the curved passage extends 360 degrees about the rotor, and adjacent solid feed guides of the plurality of solid feed guides are spaced apart less than 10 degrees relative to the rotational axis of the rotor.

9. A system, comprising:
a solid feed pump, comprising:
a housing;
a rotor disposed in the housing, wherein the rotor comprises a first disc and a second disc coupled to a hub;
a curved passage disposed between the rotor and the housing;
at least one outlet coupled to the curved passage;
a first solid feed guide extending across the curved passage adjacent the outlet, wherein the first solid feed guide is configured to direct solid feed within the curved passage towards the outlet, and the first solid feed guide comprises a first end disposed adjacent a lateral surface of the hub located between the first and second discs, wherein the first end and the lateral surface are separated by a first radial offset distance; and
a second solid feed guide extending across the curved passage adjacent the outlet, wherein the second solid feed guide is configured to direct solid feed within the curved passage towards the outlet, and the second solid feed guide comprises a second end disposed adjacent the lateral surface of the hub located between the first and second discs, wherein the second end and the lateral surface are separated by a second radial offset distance, and the first radial offset distance is greater than the second radial offset distance.

10. The system of claim 9, wherein the first solid feed guide is configured to direct greater than or equal to approximately 50 percent of a total amount of the solid feed towards the outlet, and the second solid feed guide is configured to direct a remainder of the total amount of the solid feed towards the outlet.

11. The system of claim 9, wherein the first radial offset distance is greater than or equal to approximately one-third of a distance between the lateral surface of the hub and an inner surface of the housing disposed radially above the hub.

12. The system of claim 9, wherein the first solid feed guide is configured to urge a first portion of the solid feed out of the curved passage into a first exit pipe, and the second solid feed guide is configured to urge a second portion of the solid feed out of the curved passage into a second exit pipe different from the first exit pipe.

13. The system of claim 12, wherein the first exit pipe is configured to deliver the solid feed to a different process than the second exit pipe.

14. The system of claim 9, wherein the second radial offset distance is less than about 0.50 millimeters.

15. The system of claim 9, wherein the second solid feed guide is configured to flex less than 0.25 millimeters in a direction of rotation for the rotor.

16. A system, comprising:
a solid feed pump, comprising:
a housing;
a rotor disposed in the housing, wherein the rotor comprises a first disc and a second disc coupled to a hub;
a curved passage disposed between the rotor and the housing;
an inlet coupled to the curved passage;
at least one outlet coupled to the curved passage;
a first solid feed guide extending across the curved passage adjacent the outlet, wherein the first solid feed guide is configured to direct a first portion of solid feed within the curved passage towards the outlet; and
a second solid feed guide extending across the curved passage adjacent the outlet, wherein the second solid feed guide is configured to direct a second portion of solid feed within the curved passage towards the outlet, and the first portion of solid feed is greater than the second portion of solid feed.

17. The system of claim 16, wherein the first portion of the solid feed comprises at least approximately 70 percent of a total amount of solid feed that is directed to the outlet.

18. The system of claim 16, wherein the first solid feed guide is positioned at a first circumferential location along the curved passage relative to a rotational axis of the rotor, the second solid feed guide is positioned at a second circumferential location along the curved passage relative to a rotational axis of the rotor, and the first circumferential location is between the inlet and the second circumferential location along a flow direction of the curved passage.

19. The system of claim 16, wherein the first solid feed guide comprises a first distal edge that is positioned a first radial distance from an outer surface of a hub of the rotor, wherein the first radial distance is between 30 to 75 percent of a total radial distance between the outer surface of the hub of the rotor and an inner surface of the housing disposed radially above the hub.

20. The system of claim 16, comprising a third solid feed guide extending across the curved passage adjacent the outlet, wherein the third solid feed guide is configured to direct a third portion of solid feed within the curved passage towards the outlet, and the first portion of solid feed is greater than the third portion of solid feed.

* * * * *